United States Patent [19]

Armond

[11] 4,144,038
[45] Mar. 13, 1979

[54] GAS SEPARATION

[75] Inventor: John W. Armond, Great Bookham, England

[73] Assignee: BOC Limited, London, England

[21] Appl. No.: 772,240

[22] Filed: Feb. 25, 1977

[30] Foreign Application Priority Data

Dec. 20, 1976 [GB] United Kingdom ............... 53063/76

[51] Int. Cl.² ............................................. B01D 53/04
[52] U.S. Cl. .......................................... 55/58; 55/66; 55/68; 55/75
[58] Field of Search ............... 55/25, 26, 33, 58, 62, 55/74, 75, 179, 387, 389

[56] References Cited

U.S. PATENT DOCUMENTS

| | | | |
|---|---|---|---|
| 2,893,512 | 7/1959 | Armond | 55/66 X |
| 3,102,013 | 8/1963 | Skarstrom | 55/58 X |
| 3,121,625 | 2/1964 | Broughton | 55/58 |
| 3,164,454 | 1/1965 | Wilson | 55/58 X |
| 3,242,645 | 3/1966 | De Montgareuil et al. | 55/58 |
| 3,659,400 | 5/1972 | Kester | 55/58 X |
| 3,710,547 | 1/1973 | Nelson | 55/62 X |
| 3,801,513 | 4/1974 | Munzner et al. | 55/75 X |
| 3,923,477 | 12/1975 | Armond et al. | 55/25 |
| 4,013,429 | 3/1977 | Sircar et al. | 55/58 X |

FOREIGN PATENT DOCUMENTS 1437344  5/1976  United Kingdom ..................... 55/25

Primary Examiner—Robert H. Spitzer
Attorney, Agent, or Firm—Dennison, Dennison, Meserole & Pollack

[57] ABSTRACT

A process for increasing the proportion of a gas in a gaseous mixture comprising such gas and at least two other constituents. The gaseous mixture in a substantially unpressurized condition is drawn successively through two beds of absorbent which adsorbs the two other constituents respectively by the action of a reduced pressure applied to an outlet of the second adsorbent bed in the series. The beds are then regenerated prior to a further admission of gaseous mixture thereto.

8 Claims, 3 Drawing Figures

GAS SEPARATION

FIELD OF THE INVENTION

This invention relates to separation of gases. More particularly it is concerned with such separation using a material which adsorbs more readily one or more components of a gas mixture than another or other components of the mixture.

BACKGROUND OF THE INVENTION

In conventional gas separation using adsorption techniques, it is usual to pass the gaseous mixture into an adsorbent bed under pressure and to obtain from the bed an enriched gas mixture which constitutes the desired product and is still at a small positive pressure. If the product is required at a higher pressure it must be compressed separately.

The adsorbent bed is normally regenerated before it becomes completely saturated by applying a vacuum to the bed which has the effect of drawing off the adsorbed constituents of the gas mixture ready for a further supply to the bed of feed gas mixture to be separated. It will be appreciated that such plants can require three separate pumps in order to produce product gas at higher positive pressures and can consequently constitute reasonably complex plants having a relatively high capital cost and power consumption, particularly as the pressure required for compressing the feed gas mixture can use a significant amount of power.

SUMMARY OF THE INVENTION

U.K. pat. application No. 7894/76, and corresponding U.S. Pat. application Ser. No. 772,214, filed Feb. 25, 1977, which is incorporated by reference, discloses a process for increasing the proportion of a gas in a gaseous mixture of which it is a component, which process comprises allowing the gaseous mixture in a substantially unpressurised condition to be drawn through a bed of an adsorbent material which preferentially adsorbs one or more other components of the gas mixture, at least partly by action of a vacuum applied to an outlet of the bed, e.g. by a compressor, and then regenerating the bed, preferably by evacuation thereof, prior to a further admission of the gaseous mixture to the bed. Such a process will be referred to hereinafter as "a process of the kind described."

The object of the present invention is provide a process of the kind described which is particularly suitable for separating gaseous mixtures having a desired component and at least two other constituents.

The present invention provides a process of the kind described in which the gaseous mixture includes the desired gas component and at least two other constituents, wherein the mixture is drawn successively through a first adsorbent bed which preferentially adsorbs one of said other constituents, and a second adsorbent bed which preferentially adsorbs the other, or another, of said other constituents at least partly by the action of a reduced pressure, e.g. a pump, capable of drawing a soft vacuum and at the same time compressing the gas at a pressure above atmospheric, connected to an outlet of the second adsorbent bed, and then regenerating the beds, preferably at least partly by evacuation thereof, prior to a further admission of the gaseous mixture to the beds.

According to a feature of the invention, the adsorbent beds may comprise discrete layers of adsorbent materials contained in a single vessel.

Preferably, at least three similar pairs of the adsorbent beds are provided, the pairs of beds being operated on similar cycles but out of phase with each other such that a substantially continuous stream of the desired gas is produced.

The invention also includes apparatus adapted to perform a process according to the present invention. The invention further includes an air separation plant, including such an apparatus.

A process according to the present invention is suitable for separating argon from a gaseous mixture which also includes oxygen and nitrogen, for example air or an oxygen-rich feedstock which may be withdrawn from the rectification column of a cryogenic air separation plant. In the first example, namely an air feedstock the aforesaid first adsorbent bed is preferably an adsorbent which selectively adsorbs nitrogen, for example zeolite. An oxygen rich gaseous mixture, typically containing 95% oxygen and 5% argon, is produced which is passed through the other adsorbent bed which selectively adsorbs oxygen, for example molecular sieve carbon.

The product yield can be improved, usually in a system comprising three pairs of beds, by collecting as product only an initial part of the gas withdrawn from each pair of beds (usually termed "first cut") and using the remainder of such gas ("second cut") as part of the feedstock for another bed. In the example given above in which the first bed contains zeolite, such bed also removes moisture contained in the air feedstock. The second cut, which comprises a gas only partly enriched in the product gas, is therefore a dry gas and should be passed into the zeolite first adsorbent bed at a position downstream of an initial portion thereof which removes moisture from the feed air. Such initial portion acts as a drying bed integral with said first adsorbent bed but, in other embodiments, a separate drying bed may be provided. Hitherto the percentage of argon, which is extracted from an air separation plant as a sidestream, has been limited by practical considerations governed by the nitrogen contamination of the argon product.

Using a process according to the invention, the argon may be extracted from such plant without the normal constraint of nitrogen contamination.

A cold gas stream, e.g. 12% argon, 87% $O_2$ and 1% $N_2$, may be withdrawn from the plant and may be warmed to atmospheric temperature in a heat exchanger. The first adsorbent bed encountered by such warmed gas mixture preferably comprises a material which selectively adsorbs oxygen, e.g. molecular sieve carbon, the other bed comprising a material which selectively adsorbs nitrogen, e.g. zeolite. In this way argon product is obtained which is substantially free of nitrogen, and oxygen, contamination. A stream of waste gas obtained from the aforesaid evacuation step may be recycled to a rectification column of the air separation plant after being cooled in a heat exchanger. Preferably such waste gas is used to warm the aforesaid gas mixture obtained from the air separation plant which mixture is then enriched in argon by a process according to the present invention.

An advantage of using a process according to the invention to purify an argon stream obtained from an air separation plant is that it allows a potentially greater percentage of argon extraction from the plant than the conventional method because the argon-rich feed stream can be selected on considerations for maximising the argon yield rather than considerations governed by the need to minimize nitrogen contamination of the argon rich stream taken from the rectification column of the plant. Moreover, the refrigeration in such argon rich stream can be recovered by heat exchange with the aforesaid recycled waste stream whereas in a conventional process a proportion of such refrigeration is usually lost from the air separation plant in the liquid argon product stream. A further advantage is that the flows of liquid and vapour in the rectification column are not substantially influenced by the extraction of the argon-rich stream as compared with such extraction in a conventional process in which the argon side column receives gaseous feed from the low pressure column of an air cryogenic separation plant and returns a liquid stream to the same column. These advantages enable argon to be extracted from the plant with the minimum of influence on the distillation performance of the plant for the separation of air. In this example the feedstock is already dry.

Although particularly suitable for producing argon from gas mixtures of argon, oxygen and nitrogen, a process according to the invention can also be adopted for producing other gases as product, e.g. hydrogen from a mixture with methane, carbon dioxide, carbon monoxide and moisture obtained by steam reforming a hydrocarbon followed by a "shift" reaction to increase the proportion of hydrogen. In this latter example the first adsorbent bed is conveniently molecular sieve carbon which selectively adsorbs the moisture, carbon dioxide and a proportion of the methane. The other bed is conveniently zeolite which adsorbs carbon monoxide and a greater proportion of the remainder of the methane.

DETAILED DESCRIPTION

Figure 1:
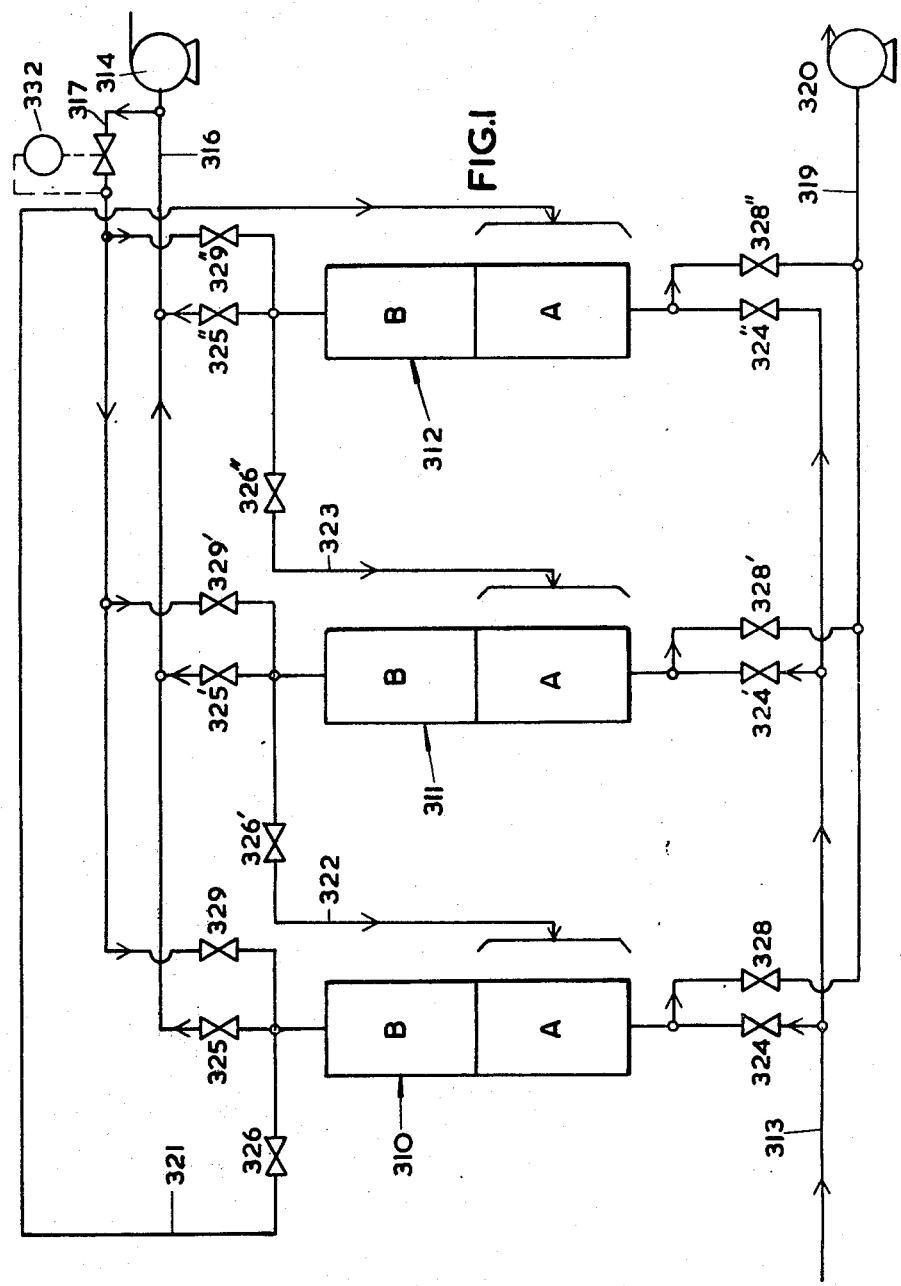
FIG. 1 is a diagrammatic representation of a pressure swing adsorption apparatus embodying the invention.
Figure 2:
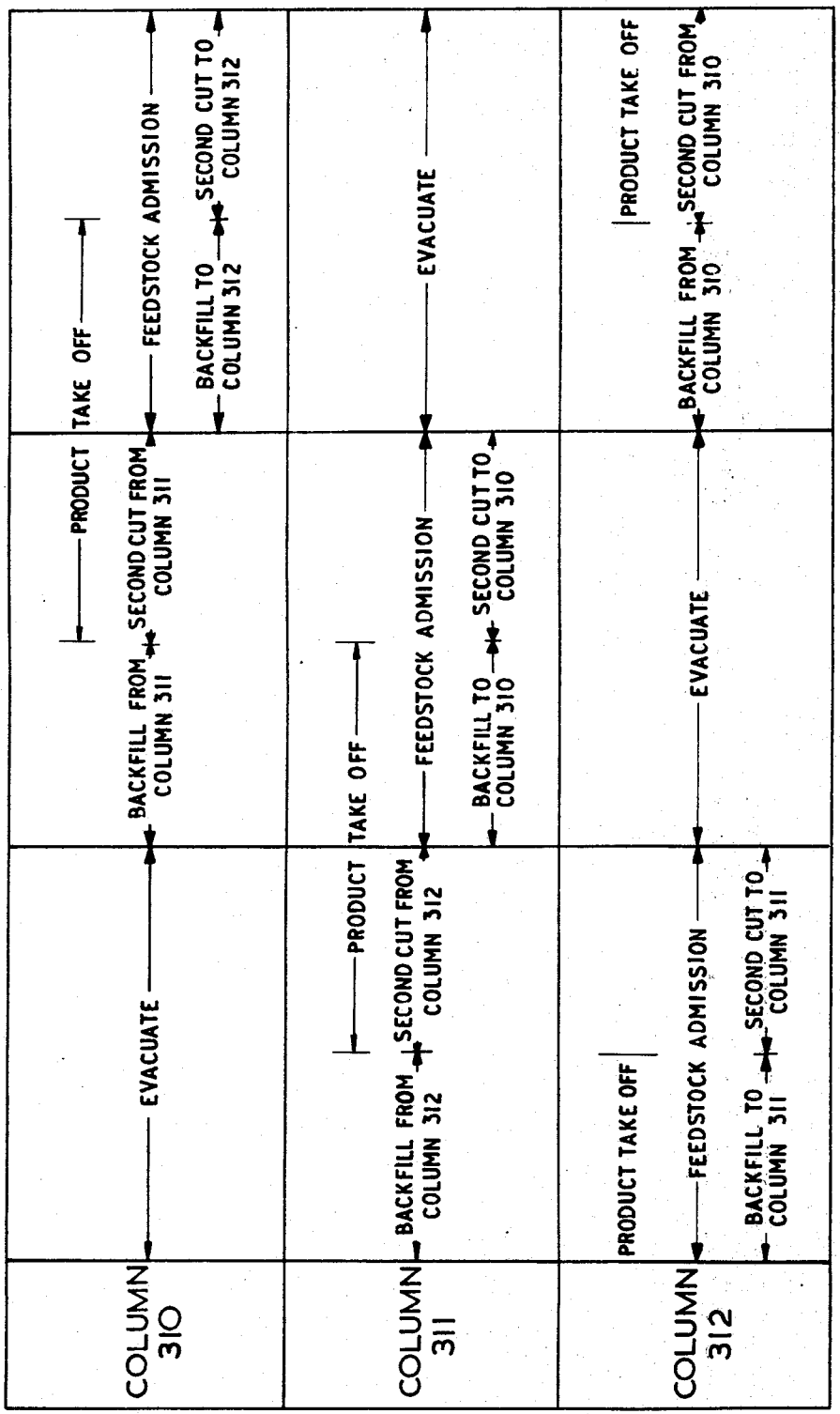
FIG. 2 is a diagram of the cycle of operation of the apparatus of FIG. 1.

Referring to FIGS. 1 and 2 of the drawings, an apparatus for recovering argon from an oxygen rich feedstock comprises three adsorption columns 310, 311 and 312. Each column contains a layer A of molecular sieve carbon adjacent its inlet end and a superimposed layer B of zeolite adsorbent materials. The apparatus has an inlet line 313 through which feedstock substantially at atmospheric pressure is drawn as described below. Product argon is withdrawn through outlet line 316 by a compressor 314 in that line which delivers the argon at a required pressure above atmospheric e.g. 10 psig. The line 316 is provided with a branch recycle line 317 for a purpose described below. The columns 310, 311 and 312 can be evacuated through 319 by vacuum pump 320. Second gas from each column can be recycled through lines 321, 322 and 323.

Considering an operating cycle in column 310, valve 324 opens and at the same time valve 325 opens so that feedstock is drawn through the adsorbent layers A and B and argon product is withdrawn through line 316. As the feed passes through the carbon layer A of column 310 oxygen in the feedstock is removed so that a substantially oxygen-free argon/nitrogen mixture passes into the zeolite layer B of the column. In the zeolite section the nitrogen is removed and a substantially pure argon product is withdrawn from the outlet end of the column. When the level of impurities begins to increase in the argon product valve 325 closes and valve 326 opens and a "second cut" is passed into column 312 at a position above the initial drying section of carbon layer A in column 12. At the end of the second cut valves 324, 326 close and valve 328 opens to regenerate the adsorbent by evacuation. On completion of evacuation, valve 329 opens to backfill bed 310 with product quality gas and after it closes valve 328 closes and valve 329 opens to backfill the column with product quality argon. Valve 329 then closes and valve 326 opens for second cut gas from column 311 to flow into column 310 and at the same time valve 325 opens for argon product to be withdrawn. When the second cut is complete valve 326 closes and valve 324 opens to admit feed gas. With three carbon/zeolite elements operating on this cycle but 120° out of phase with one another a continuous argon product stream is withdrawn. This cycle is illustrated diagrammatically in FIG. 2. The column is evacuated to about 70 torr by pump 320 during regeneration of the adsorbent layers A and B. Line 317 is automatically closed when each column reaches chosen pressure below atmospheric, e.g. 500–600 Torr, say 550 Torr, (but lower pressures may be of advantage), during backfilling by a pressure sensitive controller 332 so that the column is at sub-atmospheric pressure when valve 324 opens. The feedstock is drawn into the plant through line 313 by the action of pump 314 and of the vacuum pump 320 which regenerates the adsorbent materials.

The position of the second cut entry into the columns depends upon the feed composition and any impurities such as moisture and $CO_2$ therein. It may be in any position from the column inlet to the junction of the zeolite and carbon sieve layers A and B.

Figure 3:
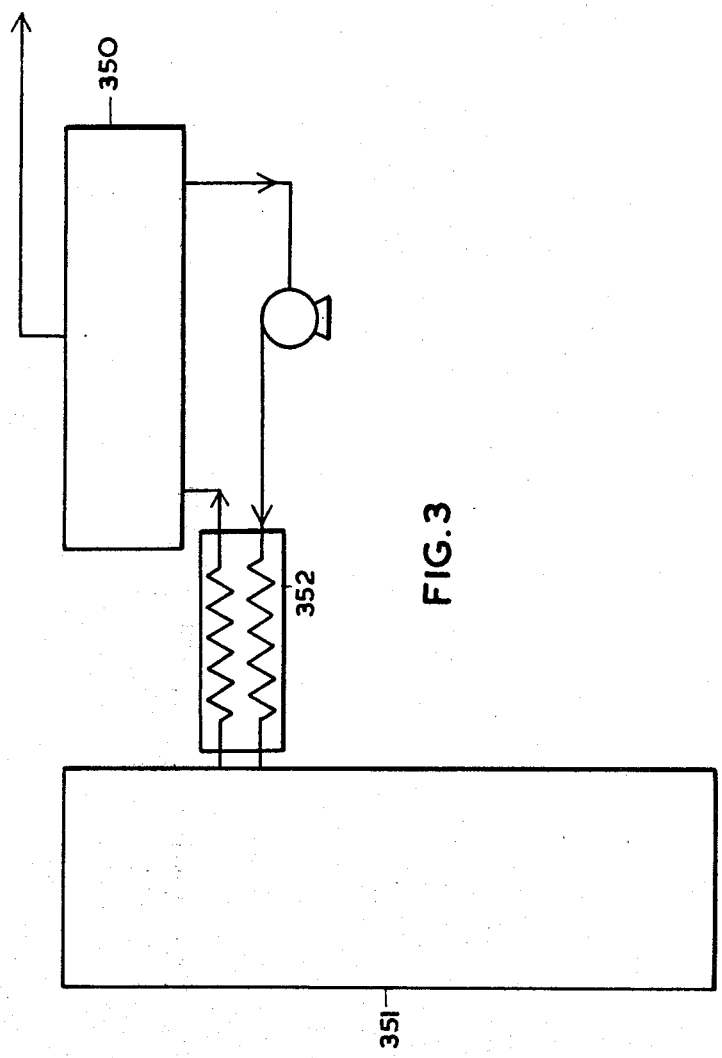
FIG. 3 is a diagrammatic representation of part of a cryogenic air separation plant incorporating an apparatus according to the invention.

FIG. 3 illustrates diagrammatically part of a cryogenic air separation plant which includes a pressure swing adsorption apparatus as described above with reference to FIGS. 1 and 2 and represented diagrammatically by block 350. A cold gas stream, for example comprising 12% argon, 87% oxygen and 1% nitrogen is withdrawn from a rectification column 351 of the air separation plant. This stream is warmed to atmospheric temperature in a heat exchanger 352 before it is fed to the apparatus 350. Waste gas produced during evacuation of the adsorption columns of apparatus 350, as described above, is passed through the heat exchanger 352 and is cooled by the cold gas stream withdrawn from column 351 before it is returned to the column such that the refrigeration of the gas stream withdrawn from the column 351 is recovered.

What is claimed is:

1. In a process for increasing the proportion of a selected component in a gaseous mixture which includes at least two other components, wherein the process employs a first adsorbent bed which preferentially adsorbs at least one of the other components and a second adsorbent bed which preferentially adsorbs at least another of the other components, the beds being connected together in series and having an inlet for the gaseous mixture at one end of the series of beds and an outlet for product gas at the opposite end of the series of beds, the improvement comprising repeating a cycle of operation which includes the successive steps of: allowing the gaseous mixture in a substantially unpressurized condition to be drawn into the beds through said inlet while simultaneously withdrawing an unadsorbed product gas from the beds through said outlet by the action of a reduced pressure applied to said outlet, and regenerating the beds by the action of a reduced pressure applied to said inlet without an intervening purge step.

2. A process as claimed in claim 1 wherein the adsorbent beds comprise discrete layers of different adsorbent materials contained in a single vessel.

3. A process as claimed in claim 2 wherein at least three similar pairs of said first and second adsorbent beds are provided, the pairs of beds being operated on similar cycles but out of phase with each other such that a substantially continuous stream of the desired gas is produced.

4. A process as claimed in claim 1 wherein said gas is argon and other constituents of the gaseous mixture include oxygen and nitrogen.

5. A process as claimed in claim 4 wherein the gaseous mixture is air.

6. A process as claimed in claim 5 wherein the aforesaid first adsorbent bed is an adsorbent which selectively adsorbs nitrogen and the other adsorbent bed which selectively adsorbs oxygen.

7. A process as claimed in claim 4 wherein the gaseous mixture is an oxygen-rich-feedstock which is withdrawn from the rectification column of a cryogenic air separation plant.

8. A process as claimed in claim 1 wherein said reduced pressure is applied to said outlet by a compressor which delivers product gas at a superatmospheric pressure.

* * * * *